(12) United States Patent
Gray

(10) Patent No.: US 7,748,617 B2
(45) Date of Patent: Jul. 6, 2010

(54) ELECTRONIC IDENTIFICATION SYSTEM

(76) Inventor: R. O'Neal Gray, 25 Highland Park Village, PMB #319, Dallas, TX (US) 75205

( * ) Notice: Subject to any disclaimer, the term of this patent is extended or adjusted under 35 U.S.C. 154(b) by 1100 days.

(21) Appl. No.: 11/359,791

(22) Filed: Feb. 22, 2006

(65) Prior Publication Data

US 2006/0180660 A1 Aug. 17, 2006

Related U.S. Application Data

(63) Continuation-in-part of application No. 11/185,112, filed on Jul. 20, 2005, now Pat. No. 7,275,685, which is a continuation-in-part of application No. 11/061,616, filed on Feb. 22, 2005, now Pat. No. 7,500,602, which is a continuation-in-part of application No. 10/964,654, filed on Oct. 15, 2004, now abandoned, which is a continuation-in-part of application No. 10/821,988, filed on Apr. 12, 2004, now Pat. No. 7,337,956.

(30) Foreign Application Priority Data

Dec. 28, 2004 (EP) .................................. 04030898

(51) Int. Cl.
*H04K 1/00* (2006.01)
(52) U.S. Cl. ........................................ 235/380; 705/64
(58) Field of Classification Search ................. 235/380; 705/26, 39, 40, 44, 64
See application file for complete search history.

(56) References Cited

U.S. PATENT DOCUMENTS

| 4,614,861 | A | 9/1986 | Pavlov |
| 4,701,601 | A | 10/1987 | Francini |
| 5,140,517 | A | 8/1992 | Nagata et al. |
| 5,317,636 | A | 5/1994 | Vizcanio |
| 5,359,182 | A | 10/1994 | Schilling |

(Continued)

FOREIGN PATENT DOCUMENTS

EP 0745961 12/1996

(Continued)

OTHER PUBLICATIONS

Mastercard International; Frequently Asked Questions About MasterCard SecureCode; 1994-2004, pp. 1-2.

(Continued)

*Primary Examiner*—Daniel A Hess

(57) ABSTRACT

An electronic identification system comprising a system server and a plurality of mobile devices, the system server and the mobile devices being electronically connectable, where the system server contains references to a plurality of subscribers to the system. The system server receives an electronic request message from a remote location to verify an identity, where the request message contains a reference to the requesting remote location and a reference to an identity to be verified. The system server identified the received referenced identity with one of the plurality of mobile devices (the identified mobile platform), and the system server transmits a confirmation message to the identified mobile device, where the confirmation message contains a reference to the requesting remote location and the identity to be verified. The system server receives a verification message from the identified mobile device in response to the confirmation message, where the verification message contains an authorization to confirm/not confirm identification.

15 Claims, 10 Drawing Sheets

U.S. PATENT DOCUMENTS

| | | |
|---|---|---|
| 5,477,038 A | 12/1995 | Levine et al. |
| 5,557,518 A | 9/1996 | Rosen |
| 5,572,004 A | 11/1996 | Raimann |
| 5,585,787 A | 12/1996 | Wallerstein |
| 5,591,949 A | 1/1997 | Bernstein |
| 5,615,110 A | 3/1997 | Wong |
| 5,710,887 A | 1/1998 | Chelliah et al. |
| 5,711,012 A | 1/1998 | Bottoms et al. |
| 5,726,893 A | 3/1998 | Schuchman et al. |
| 5,727,163 A | 3/1998 | Bezos |
| 5,793,302 A | 8/1998 | Stambler |
| 5,890,137 A | 3/1999 | Koreeda |
| 5,913,202 A | 6/1999 | Motoyama |
| 5,914,472 A | 6/1999 | Foladare |
| 5,955,961 A | 9/1999 | Wallerstein |
| 5,960,411 A | 9/1999 | Hartman et al. |
| 5,991,749 A | 11/1999 | Morrill, Jr. |
| 6,070,154 A | 5/2000 | Tavor et al. |
| 6,088,683 A | 7/2000 | Jalili |
| 6,104,726 A | 8/2000 | Yip et al. |
| 6,138,917 A | 10/2000 | Chapin |
| 6,226,529 B1 | 5/2001 | Bruno et al. |
| 6,250,557 B1 | 6/2001 | Forslund |
| 6,254,000 B1 | 7/2001 | Degen |
| 6,311,167 B1 | 10/2001 | Davis et al. |
| 6,324,526 B1 | 11/2001 | D'Agostino |
| 6,327,348 B1 | 12/2001 | Walker |
| 6,378,075 B1 | 4/2002 | Goldstein et al. |
| 6,446,048 B1 | 9/2002 | Wells et al. |
| 6,473,500 B1 | 10/2002 | Risafi et al. |
| 6,493,338 B1 | 12/2002 | Preston et al. |
| 6,598,031 B1 | 7/2003 | Ice |
| 6,607,127 B2 | 8/2003 | Wong |
| 6,609,113 B1 | 8/2003 | O'Leary et al. |
| 6,611,818 B1 | 8/2003 | Mersky et al. |
| 6,615,183 B1 | 9/2003 | Kolls |
| 6,636,833 B1 | 10/2003 | Flitcroft et al. |
| 6,662,020 B1 | 12/2003 | Aaro et al. |
| 6,690,681 B1 | 2/2004 | Preston et al. |
| 6,749,114 B2 | 6/2004 | Madani |
| 6,798,762 B1 | 9/2004 | Olson |
| 6,805,287 B2 | 10/2004 | Bishop |
| 6,805,288 B2 | 10/2004 | Routhenstein |
| 6,839,692 B2 | 1/2005 | Carrott et al. |
| 6,991,157 B2 | 1/2006 | Bishop |
| 7,069,248 B2 * | 6/2006 | Huber ............ 705/64 |
| 7,090,123 B2 | 8/2006 | Walker |
| 7,292,999 B2 | 11/2007 | Hobson |
| 7,337,229 B2 | 2/2008 | Dutta et al. |
| 2001/0039535 A1 | 11/2001 | Tsiounis et al. |
| 2002/0001317 A1 | 1/2002 | Herring |
| 2002/0026519 A1 | 2/2002 | Itabashi et al. |
| 2002/0049639 A1 | 4/2002 | Tanaka et al. |
| 2002/0065774 A1 | 5/2002 | Young |
| 2002/0077993 A1 | 6/2002 | Immonen et al. |
| 2002/0083008 A1 | 6/2002 | Smith et al. |
| 2002/0128929 A1 | 9/2002 | Urabe |
| 2002/0133467 A1 | 9/2002 | Hobson et al. |
| 2002/0145043 A1 | 10/2002 | Challa et al. |
| 2002/0178122 A1* | 11/2002 | Maes ............ 705/64 |
| 2003/0001005 A1 | 1/2003 | Risafi |
| 2003/0014371 A1 | 1/2003 | Turgeon |
| 2003/0028481 A1 | 2/2003 | Flitcroft et al. |
| 2003/0066879 A1 | 4/2003 | Cummins |
| 2003/0075610 A1 | 4/2003 | Ong |
| 2003/0120592 A1 | 6/2003 | Ng |
| 2003/0126076 A1* | 7/2003 | Kwok et al. ............ 705/40 |
| 2003/0191945 A1 | 10/2003 | Keech |
| 2003/0210708 A1 | 11/2003 | Belotserkovsky |
| 2004/0019564 A1 | 1/2004 | Goldthwaite et al. |
| 2004/0029569 A1 | 2/2004 | Khan et al. |
| 2004/0059642 A1 | 3/2004 | Koster et al. |
| 2004/0090992 A1 | 5/2004 | Lee |
| 2004/0097217 A1 | 5/2004 | McClain |
| 2004/0177005 A1 | 9/2004 | Poltorak |
| 2004/0193553 A1 | 9/2004 | Lloyd et al. |
| 2004/0243490 A1 | 12/2004 | Murto |
| 2005/0138429 A1 | 6/2005 | Miura |
| 2006/0144925 A1 | 7/2006 | Jones |
| 2008/0010217 A1 | 1/2008 | Hobson et al. |
| 2008/0010220 A1 | 1/2008 | Hobson et al. |

FOREIGN PATENT DOCUMENTS

| | | | |
|---|---|---|---|
| EP | 1 331 582 A | | 7/2003 |
| FR | 2792143 | | 10/2000 |
| WO | 96/38799 | | 12/1996 |
| WO | 98/06214 | | 2/1998 |
| WO | WO 2005/024677 | * | 3/2005 |

OTHER PUBLICATIONS

VISA; Verified by Visa; 2005, USA, p. 1.

Sankarson Banerjee, Senior Architect, Mphasis; Credit Card Security on the Net: Where is it today?; 2004, pp. 21-23.

VISA; How it Works; 2005, USA, pp. 1-2.

Encorus Technologies; Mobile Payments Examples: M-Commerce Opens up a World of Opportunities; 2002, pp. 1-11.

George Walsh and Gabriel Berger, Director of Research & Development, DCTI E-Payment Services; Alternative Payment Methods: Aug. 2000. pp. 1-8.

Vivo Tech; RF-Based Contactless Payment: A Moret Convenient Way to Pay; 2003, pp. 1-25.

Mark E. Peters, IBM Corporation; Emerging eCommerce Credit and Debit Card Protocols; pp. 1-8.

Tony Hegarty, Eric Verheul, Dirk Steuperaert, & Georgia Skouma; Study on the Secuirty of Payment Products and Systems in the 15 Member States: Jun. 2003. pp. 1-124.

"On-Line E-Wallet System With Decentralized Credential Keepers", Mobile Networks and Applications, vol. 8, No. 1, Feb. 1993, pp. 87-99.

"Payments and Banking With Mobile Personal Devices", Communications of the ACM, vol. 46, No. 5, May 2003, pp. 53-58.

Office action mailed Aug. 19, 2005, for U.S. Appl. No. 10/821,988.

Final Office action mailed May 5, 2006, for U.S. Appl. No. 10/821,988.

Notice of Allowance mailed Jul. 24, 2007, for U.S. Appl. No. 10/821,988.

Notice of Allowance mailed Dec. 7, 2007, for U.S. Appl. No. 10/821,988.

Office action mailed Dec. 29, 2006, for U.S. Appl. No. 10/964,654.

European Search Report mailed Feb. 10, 2006 for EP 4030898.3.

Office action mailed Jul. 10, 2007, for U.S. Appl. No. 11/061,616.

Final Office action mailed Nov. 23, 2007, for U.S. Appl. No. 11/061,616.

Office action mailed Apr. 21, 2008, for U.S. Appl. No. 11/061,616.

Notice of Allowance mailed Nov. 25, 2008, for U.S. Appl. No. 11/061,616.

European Search Report mailed Sep. 6, 2005 for EP 5007866.6.

Office action mailed Oct. 23, 2006, for U.S. Appl. No. 11/185,112.

Final Office action mailed Mar. 9, 2007, for U.S. Appl. No. 11/185,112.

Notice of Allowance mailed Jun. 8, 2007, for U.S. Appl. No. 11/185,112.

Office action mailed Oct. 7, 2009, for U.S. Appl. No. 11/845,895.

Office action mailed Nov. 19, 2008, for U.S. Appl. No. 12/035,245.

Final Office action mailed Jun. 1, 2009, for U.S. Appl. No. 12/035,245.

International Search Report mailed Dec. 4, 2006, for PCT/US05/035882.

* cited by examiner

ELECTRONIC IDENTIFICATION SYSTEM

This application is a continuation-in-part of U.S. application Ser. No. 11/185,112 filed on Jul. 20, 2005, U.S. application Ser. No. 11/061,616 filed on Feb. 22, 2005, European application number 04030898.3 filed on Dec. 28, 2004, U.S. application Ser. No. 10/964,654 filed on Oct. 15, 2004, and U.S. application Ser. No. 10/821,988, filed on Apr. 12, 2004, and claims the priority benefit thereof and which are incorporated by reference herein in their entirety.

FIELD OF THE INVENTION

This invention relates to personal identification using data stored on a mobile communications device.

BACKGROUND OF THE INVENTION

Currently, businesses, governments and other entities have the need to verify the identification of an individual, such as to confirm status as a registered voter, confirm status as a person authorized to enter a building, confirm the ID of an individual in order to provide access to associated personal information (health records, credit reports, account payment histories) and to confirm the identity of a person for a transaction (such as a credit card transaction) account transaction, such as transfer of funds form a bank account to a third party vendor. Today, identification confirmation consists of visual inspection of a photo identity card, or requiring the individual to supply biometric data (hand print, rental scan, finger print, signature etc) or other identifying characteristics in order to confirm the an identity. In a remotely initiated transaction, identification is now "verified" by requiring the person to supply a password or other uniquely identified data. These methods are subject to manipulation, theft and fraud due to the ease of access to the individual's information and may require expensive biometric scanners.

Each individual has a wealth of information associated with him/her, such as social security number, health records, insurance coverage (heath, homeowners, etc) voter registration numbers, and a host of other data and information that needs to be intelligently managed. Currently, individuals store such information on cards in wallets or handbags, or may store such information in a file that is electronically accessible, for instance in a PDA. It is desired that the management system be integrated into an identification system, as once the ID of the individual is verified, the information about that individual should be readily available under user control.

For instance, applicant's prior application U.S. applications, Ser. Nos. 11/185,112 and 10/964,654 dealt with a system to manage credit card accounts, and the ability to verify the owner of the account. That application is hereby incorporated by reference in its entirety. A more comprehensive system is needed for verification and control of subscriber information.

SUMMARY OF THE INVENTION

The invention allows a subscriber to provide identify confirmation to a third party requesting such. The invention provides a system for sending a request to confirm identity to a handheld electronic communications device associated with the individual. The electronic device can be a cell phone, PDA, or other device capable of communicating wirelessly in response to a request to confirm. As part of the ID confirmation process, the individual may provide a third party access to subscriber personal information, either by providing the personal information for a data based stored within the system, or providing a verified request to a third party provider to provide the requested personal information.

The invention allows the individual to pre-load into the communications device all of the identification information necessary to respond to a request for ID confirmation. The associated personal information may also be stored in a data base on the communications device or on a remote system database, or alternatively, pointers to the stored date can be provided. At the time of use, the individual enters in a "transaction" that requires confirmation of ID. For instance, assume the person desires entry into a building or remotely access a computer. The individual enters his identification information (which can be one or more identifiers, such as name, cell phone number, account number, etc) into a receiving device. The user may manually input the required information into the receiving device, or such information can be read from a smart card, magnetically encoded card, or electronically transmitted to the receiving device from a storage device, such as a blue tooth enabled PDA or cell phone. The identifier information can be a cell phone number, individual number, name, or other identifiers. For instance, the individual may swipe a magnetically encoded ID card into the building access terminal.

The receiving device accepts the identifier information and determines that identification is to be confirmed using the System. Such determination may be done by correlating the user input parameters within a database, or the input parameters may itself contain indicators that identifies that ID verification is to be performed with the System. For instance, if the user swipes a card, the card may contain the information that ID is checked using the System; alternatively, the building access may be configured only to allow System provided confirmation as the default ID verification system. The receiving device system forwards the received user identification information with optional information on the transaction (requesting building access) to a remote ID System.

The remote ID system receives the identifier information and transmits a request to verify ID to a cell phone or other mobile communications device that is associated with that individual. The holder of that cell phone receives the request to confirm ID, and may authorize release of a confirmation of ID, and may also provide for release of relevant requested personal information.

BRIEF DESCRIPTIONS OF THE DRAWINGS

DETAILED DESCRIPTION OF THE INVENTION

The invention is a generally a system that provides a secure means of providing identification confirmation within a transaction that requires a confirmation of identity. Other types of transactions and uses of the system will be later described. The system includes computers configured with software to communicate over data lines between the direct and indirect actors involved in a particular transaction. Direct actors in the transaction include the subscriber or customer (an entity that has established a system account and for whom identification verification is requested), and the entity requiring ID confirmation (referred to as a vendor or merchant). The invention includes a system server that acts as an indirect actor acting as an intermediary between the direct actors to ensure secure data transmissions between the direct actors. First, the general communication channels between actors will be described.

1. General Communication Channels

Communication for a particular transaction involves a subscriber mobile platform 1, a merchant platform 2, and a system platform 4. The vendor/merchant and system platforms generally comprise one or more computers, each platform having its own internal structure. Communications between platforms will be undertaken by computers, generally described as servers, which communicate over networks, such as the internet, or data lines. The subscriber mobile platform 1 is a mobile device 100 that communicates (through intermediaries) to the system platform 4 computer. The general communication paths are shown in FIG. 1 for a voice initiated transaction, and in FIG. 2 for an electronically initiated transaction.

Figure 1:
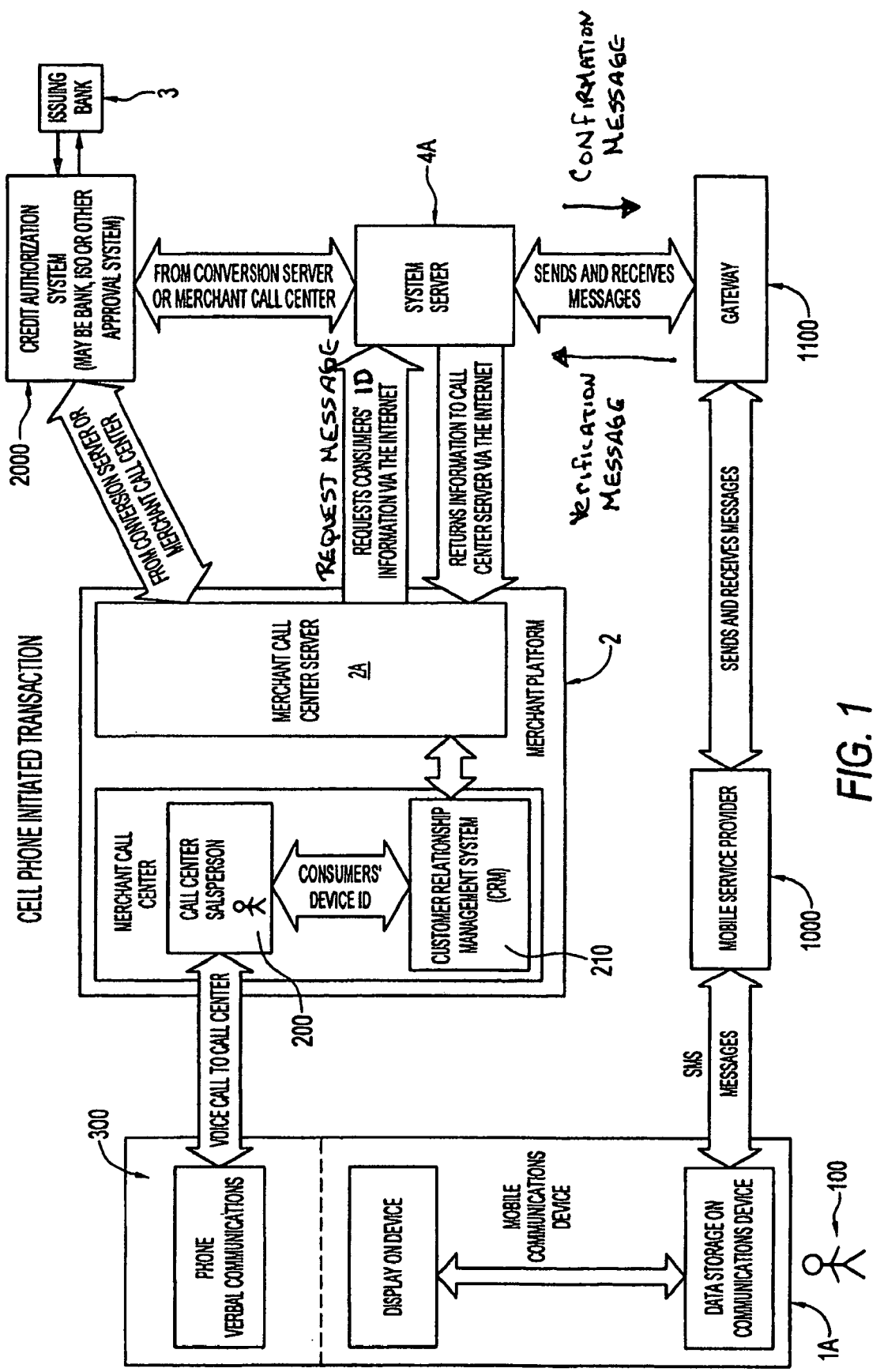
FIG. 1 is a schematic showing the communications between the interfacing platforms in a voice initiated transaction.
Figure 2:
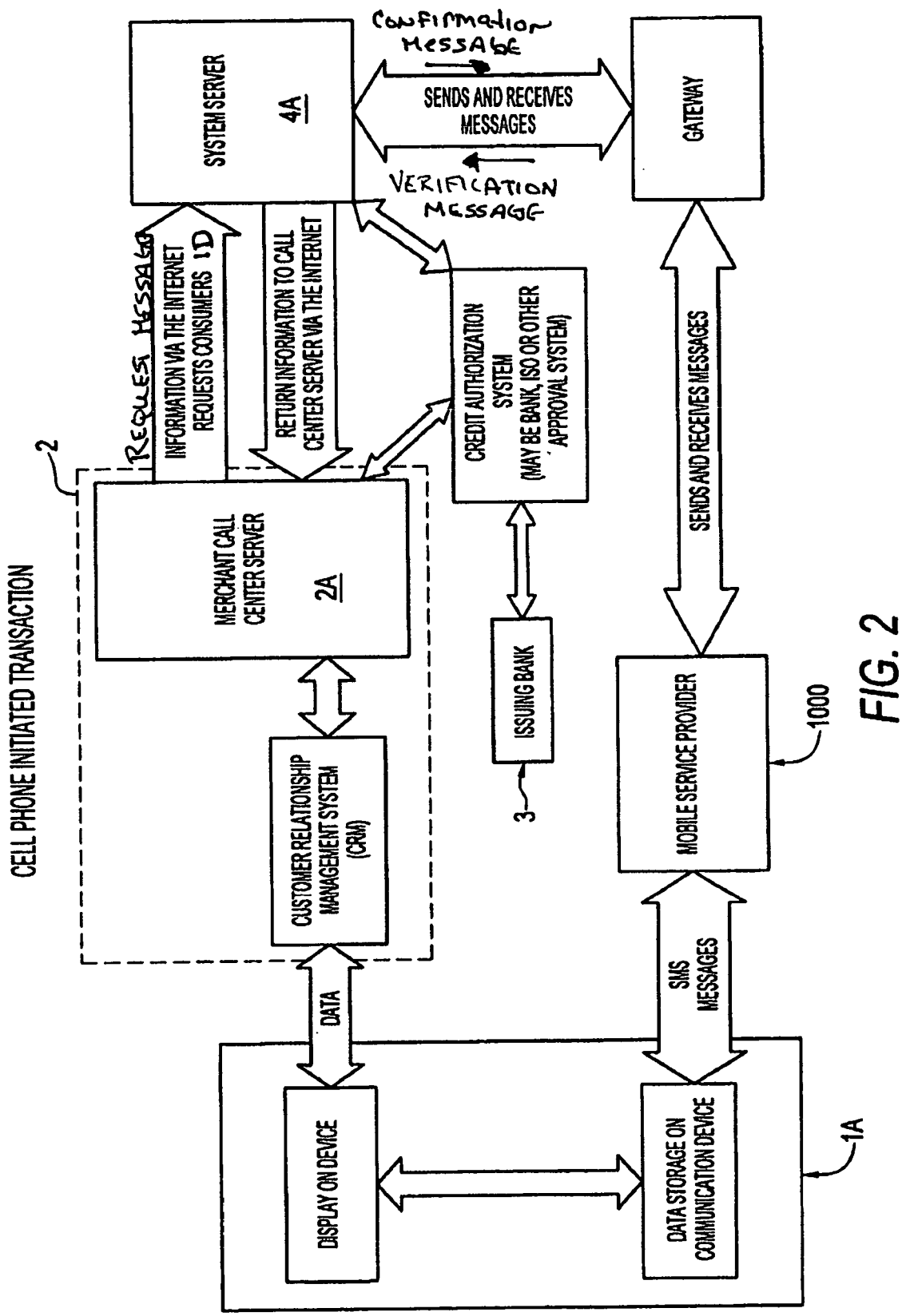
FIG. 2 is a schematic showing the communications between the interfacing platforms in a data initiated transaction
Figure 3:
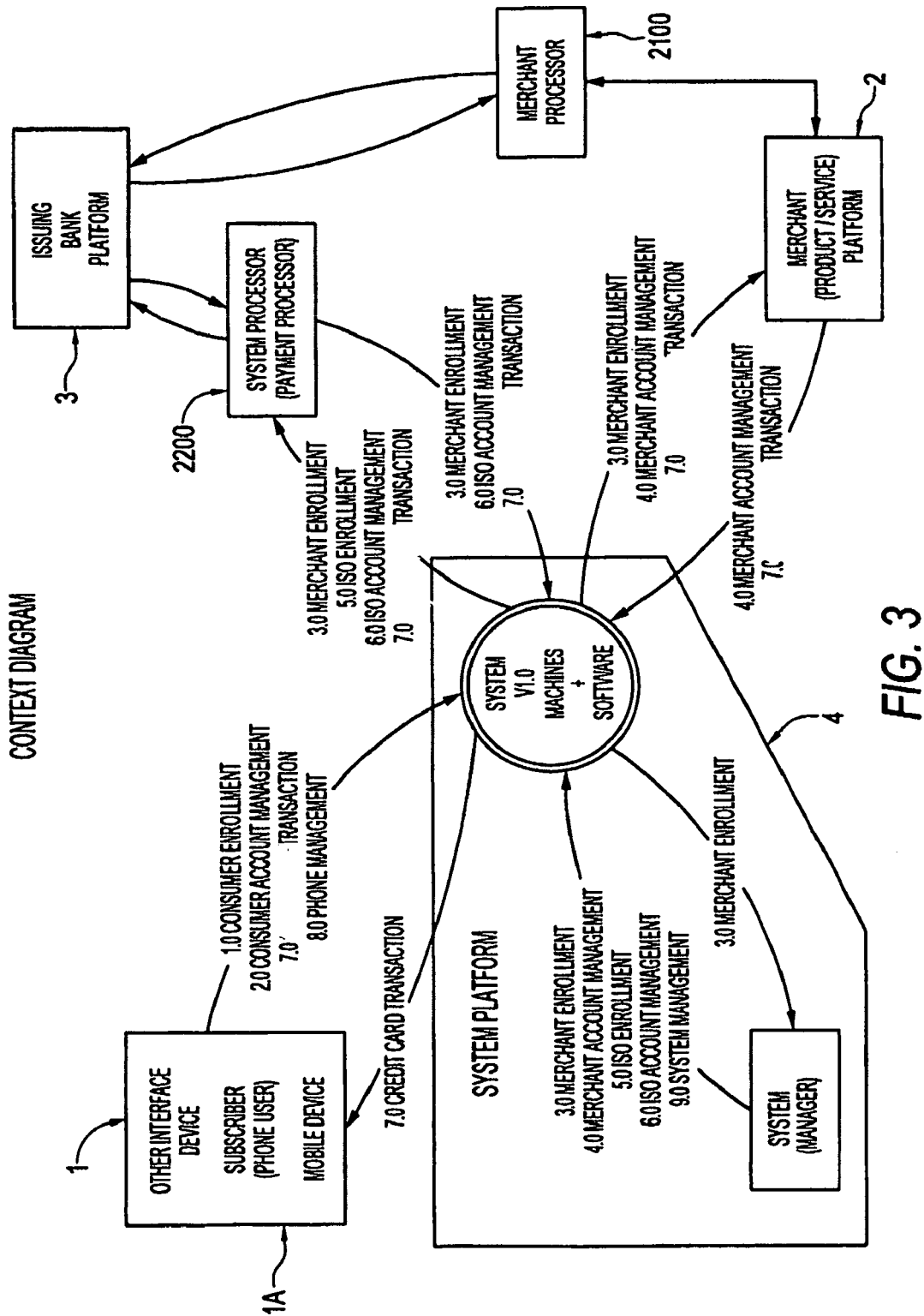
FIG. 3 is a schematic showing the general communications between the platforms

Shown in FIGS. 1 and 2 are the system server 4A (the "System Server") and the merchant server 2A. The System Server 4A interfaces over data channels to the merchant server 2A. Communication can be over the Internet or other network, dial up data line, or a direct data line. The System Server 4A will also communicate (through intermediaries, such as the mobile service provider) with the subscriber mobile device 1A. The System Server 4A generally does not communicate with the subscriber mobile device 1A through voice communications.

In the voice initiated transaction shown in FIG. 1, the subscriber 100 will initiate communication via voice, either in person or remotely through a telephone or other voice link, with a vendor or merchant representative 200, possibly located in a call center or at a point of service (building guard, voter precincts, etc). The subscriber 100 provides pertinent transaction information to the merchant representative 200 (such as name, or subscriber account or cell phone number), generally, the input transaction information will include a reference to the subscriber's identity (subscriber id, account information, cell phone number or other information that can be identified with the subscriber by the System Server). The merchant representative 200 enters the received data into the merchant's electronic transaction system 210, such as a consumer relationship management (CRM) system. The electronic transaction system 210 may be on a separate computer or the same computer as the merchant server 2A. The merchant's electronic transaction system 210 interfaces the merchant server 2A (possibly through a host or other computer, or could be the same machine) and the merchant server 2A communicates pertinent information on the transaction to the System Server 4A in a request message. The request message contains the reference to the subscriber's identity and a reference to the location requesting identity confirmation (merchant identification, merchant name, physical location (voting precincts) or other merchant transactional characterizing information that could be relevant to the subscriber to identify the transaction that has a pending ID request. The System Server 4A transmits selected transaction information to the subscriber mobile device 1A in a confirmation message to be displayed on the visual display screen for the subscriber. The subscriber 100 will respond to the transaction information in a verification message, for instance by sending an authorization to confirm identity or authorization to transmit stored identifiers. The System Server 4A will receive authorization information from the subscriber mobile device 1A and will communicate selected authorization information to the merchant server 2A. For instance, the user could be attempting to purchase stock from a stockbroker over the phone, and the stockbroker desires to confirm the identity of the user. In this instance, the stockbroker enters identifying information into the stockbroker's transaction platform. The transaction platform communicates a request message containing relevant identifiers for the client subscriber in a request to confirm the client's identity to the System Platform and identifiers to characterize the relevant transaction (stockbroker name or account wherein an ID request is pending). The System Platform sends an ID request to the subscriber mobile device in a confirmation message, along with other relevant information (such as the identity of the stockbroker requesting identity confirmation). The user receives the confirmation message with ID request on his mobile device, and may authorize a confirmation of identity. Confirmation of ID can be an affirmation or the release of personal information (as later described). The authorization is transmitted to the System Server in a verification message, which then transits the authorization back to the merchant server, who will act on the request, i.e. confirm identity and allow the stock transaction.

As shown in FIG. 1, the voice communications can be established through the voice channel of the mobile cell device 1A (if so equipped), but the voice communications between the merchant representative 200 and the subscriber 100 can also be established through any other phone type device (cell, land line, VOIP, etc) 300, as indicated by the dotted line in FIG. 1.

The data flow in an electronically initiated transaction, such as an Internet transaction, a remote terminal transaction (bank ATM, building access controller, computer with card reader) is similar, except all transaction data is "entered" by the subscriber 100 electronically without interfacing a merchant representative 200. The subscriber 100 may pass information electronically through a swipeable magnetically encoded card, a short range electromagnetic transmission between a mobile electronic device and a receiving terminal (such as a blue tooted enabled cell phone) or the user may access a web site for the particular transaction (such as the merchant's web page, e.g. absentee voter page) and enter the initial identifiers, or have subscriber information read from a magnetically encoded card, transmitted via the mobile device For instance, the subscriber 100 may use any Internet connected device to initiate the transaction, including the subscriber mobile device 1A.

Obviously, these communication paths may involve intermediaries through which data is passed. For instance, positioned between the subscriber mobile device 1A and the System Server 4A is the mobile service provider's 1000 equipment. Additional intermediaries may be positioned between the System Server 4A and the mobile service provider 1000; for instance, data may pass through a third party vendor service provider machine that addresses interfacing issues with mobile service providers (as cell format is not standardized in the United States).

Other intermediaries can be positioned to communicate with the merchant and/or the System Server. For instance, for electronic voting, a voter registrar processor may be positioned between the voting web page or voter precincts/booth and the System Server. Identification information could be sent to the voter register processor to verify that the individual whose identify is requested is a registered voter and has not cast previous votes in the specified election before ID is verified. Alternatively, the voter register process could be in communication with the System Server, and information sent to the voter register processor, either concurrently with the request to verify ID or after the ID has been verified.

In another typical transaction, a doctor's office may need to request authorization for release of medical records or to obtain the patients current health insurance information in order to verify coverage or have coverage pre-approved. At the doctor's office, the personal identification information is obtained from the patient. Again, the ID could be patient name, subscriber System identifier, or other unique identifier. The physician's server contacts the System Server with a transaction request) identifier of patient, and requested transaction personal data (health carrier, records retrieval request or other data pertinent to a particular transaction). The System Server notifies the subscriber of the relevant details of the request (Physician office requesting health carrier, release of records, etc). By responding to the request for data (allowing release of health carrier information, granting access health records), the response inherently confirms the ID of the subscriber. Data to be released may be stored either in the mobile communications device or databases attached to the System Server (or a combination). The System Server may send the relevant personal subscriber information (health carrier and policy number) back to the Doctor's office. Additionally, the health carrier's server may be an indirect actor in the transaction, and the System Server may forward may forward the subscriber's ID to the health carrier (and other relevant information, such as policy number) to confirm subscription status (still covered) and may also forward the details of the transaction (as provided by the physician's server) to the health carrier's server for confirmation of coverage for the particular transaction (e.g. confirm coverage for routine examination and co-pay). Confirmation may be sent to the System Server for transmission to the physician server, or sent directly from the health carrier server to the physician server.

In a financial transaction, such as a credit card or automated clearing house transaction, the intermediary may include a credit authorization system (shown in FIG. 1). In this instance, once ID is confirmed, information on the transaction and credit account would be forwarded to a credit authorization system to approve the issuance of credit.

An organization or other entity or service provider positioned between the merchant and/or the System Server will generally be referred to as a "Processor" 2000). The Processor may communicate with the System Server, or the System Server and merchant server.

A. Subscriber Platform Communications

The subscriber platform 1 includes a mobile communications device 1A that will generally be described as a cellular telephone, although other mobile devices (e.g., other wireless devices, such as PDSs, Blackberrys, etc) capable of supporting data exchanges can be used. Cell phones typically have a voice channel, one or more data channels and one or more control and signaling channels. With the convergence of cellular technology with Internet technology, the mobile platform described can be implemented on a wireless networked device, such as a PDA, Blackberry, laptop, etc, with or without voice capabilities. The implementing mobile device 1A should be equipped with a means to allow third parties to initiate electronic communications to the mobile device. For instance, with mobile cells phones, the means to initiate communications with the device is the unique cell phone number which can be found through the cellular network, thus providing the capability to initiate communications to the cell phone by a third party. With a wireless Internet accessible devices, the required ability for a third party to initiate communications generally requires that the device be associated with a mobile telephone number (such as reflected in the Blackberry device) or that the device have a static IP address to allow the mobile device to be located.

As wireless Internet devices (such as PDA or other personal communication devices) usage grows and VOIP becomes more prevalent (and ultimately migrates to mobile VOIP), it is anticipated that other technologies will be developed to allow third parties to initiate communications to such mobile devices. While the System will be described with a cellular phone embodiment 10 of a mobile device 1A, the invention is not limited to mobile cells phones as the mobile communications device. Every mobile device 1A must have processing capabilities, database storage capabilities, and location abilities (later discussed), and currently, it is preferred that the device be equipped with Records Management System (RMS). Each mobile device achieves its mobility as a wireless communications device. Currently, Motorola V series cell phones are suitable.

The overall system includes a mobile software module that resides on the subscriber's mobile communications device 1A (such as a cell phone), and may include a merchant software module that resides on the merchant platform 2 and interfaces with the merchant's electronic ordering system 210, and system server software that resides on the System platform 4. In general, communications between the System platform 4 and merchant platform 2 are accomplished by computers referred to as servers using the Internet, direct dialed communication lines, leased lines or other suitable network path or data line for the communication channel. Communications between the issuing bank platform 3 (again, generally described as being accomplished through a server computer) and other servers can be through the Internet, dial up data channel or a dedicated communications channel, generally provided through a Processor 2000 intermediary. Communications with the subscriber's cell phone 1A from computers in the System will be over either the cell data channels or the cell control and signaling channels (all of which are considered data channels). The particular communication protocol to the cell phones data channels can vary as no one standard has been adopted (at least in the United States), and the invention is independent of such. Generally, variations in interfacing with a particular cell phone are addressed by the cell service provider and are transparent to the System platform 4.

Communications to/from the System Server 4A to the subscriber mobile device 1A can be Internet formatted (i.e. hyper text transport protocol (HTTP) of hyper-text markup language (HTML) messages). However as most cell mobile devices are not equipped to handle full HTML transmissions due to the limited processing/visualization nature of the cell mobile device, the HTML transmissions (or other type format utilized) from/to the System Server 4A will usually be converted to a suitable format for transmission/reception by the mobile device. A software/hardware interface is required convert the HTML transmission to a format usable by the cell device. One common typical interface is a gateway 1100. The gateway will normally be controlled by the mobile service provider. For instance, if the mobile device is WAP (wireless application protocol) enabled, the gateway would be a WAP gateway, converting WAP/WML (wireless markup language) to HTTP/HTML. However, the current embodiment of the device uses short messaging system (SMS) transmission for communications with mobile cell phones due to the large number of mobile devices that are not WAP enabled and the uncertainty of WAP's future. Further, shortcode SMS style transmissions can be used, where normal style SMS requests are typically tied to a real phone number, while short codes can be set to a virtual phone number. Most mobile cells have SMS capability, and hence, the gateway is considered a SMS gateway converting HTML to SMS. For PDA's or other non-voice mobile devices, WAP (or other accepted standard) communications protocol can be used.

An added advantage of SMS is that most mobile voice devices allow simultaneous SMS messaging capability and voice communication. On some mobile cell phones, data channels and voice channels cannot be used concurrently using WAP data communications. The ability to simultaneous use voice/data communication within a single transaction, as later described, is an additional reason to adopt SMS communications. One drawback of SMS communications, however, is that only short 120-160 byte messages can be sent via SMS (a limitation of the SMS system). Hence, as mobile data communication technology develops, other communication protocols may be adopted for use in the system for the subscriber platform mobile communications device.

SMS messages will be used to communicate with the applications program residing on the mobile device 1A. Hence, the initial SMS "System" message will "start" the appropriate system application program on the mobile device. The mobile device 1A is generally equipped with an applications management system (AMS) to coordinate and manage voice communications, data communications, and application programming stored on the device. Hence, the initial System Server 4A message contains an identification of the application program to be started on the mobile device (the "app id"). The System message is converted to SMS by the SMA gateway 110, and the AMS extracts the app id and starts the identified application program on the mobile platform 1A. The mobile device system applications program informs the resident AMS program that keyboard input or other inputs on the mobile device should be routed to the executing mobile device application program and not to the cell phone voice call program. Hence, if the user is using the same mobile device for the voice call (for instance, by using headphones, a speakerphone option, or simply shuttling the device between an ear position for voice and other positions for inputting data), then keyboard entries used for data transmissions to the System Server 4A will not disrupt the voice conversation.

Generally, each SMS message will pass an identifier to notify the AMS of the proper recipient of the incoming data (the app id). At the end of the application, AMS is notified of application closing and may be configured to close program features (such as clean up the related resources, return keyboard operations to the cell voice program, etc).

B. Merchant Platform Communications

The merchant platform 2 must communicate with the System platform 4 pertinent information concerning the transaction, such as merchant ID, user provided identifiers or subscriber id, and/or transaction details (request to verify voter status, request for health records, request to pay bill, etc). To facilitate this communication, a system merchant software module may be installed on the merchant platform 2 to work in conjunction with (or integrated into) merchant's electronic transaction system 210 to (a) capture pertinent information from the System platform 4 communications and pass to the merchant transaction software 210 (such as the CRMS software); and (b) to capture pertinent transaction information from the merchant transaction software and pass to the System Server 4A. Many merchant electronic transaction systems are industry standard applications and the merchant system software module (if utilized) can be standardized. However, some merchant electronic transaction systems are custom developed installations, and hence, the system merchant software module would require a degree of customization.

An alternative to providing merchant system software module would be to allow the merchant to configure the merchant server 2A to communicate with the System Server 4A by establishing data types and formats for data transactions between the two platforms and use established communications services to request and exchange data between the platforms. One such communication service would be employing a Web Services environment using existing protocols, such as web services description language (WSDL), Universal Description, Discovery and Integration Service (UDDI) and SOAP (Simple Object Access Protocol). In this fashion, each party (the merchant or the system server) can determine what information is needed from the other party for its ongoing subscriber transaction, and request such for the other party.

Currently, communications between the System platform 4 and merchant platform 2 are implemented between their respective servers using the Internet as the data channel. However, dedicated or private networks could be utilized if the volume justified cost expenditures, and frame relay Network services could be employed. Alternatively, instead of communicating with the merchant platform 2, the System platform 4 could communicate with the merchant platform 2 through the merchant processor 2100. This is generally not preferred, due to substantial modifications in the existing infrastructure that would be needed.

C. The System Platform Communications

The communications at the System platform 4 will be more easily described in a detailed description of a transaction, described below and detailed in general in FIG. 7. In the transactions described, communication will be referred to as being between platforms (e.g. merchant platform, system platform), and generally, this refers to communication between computers, and for Internet communication, between servers.

2. Transactions

A. The Voice Initiated Transaction.

In this transaction, the subscriber 100 initiates a voice link to the merchant representative 200. The subscriber 100 also has a mobile communication device 1A that includes a processing unit, memory, and data communications interface. Stored in the mobile communications device 1A or the System platform 4 databases will be relevant transactional information, such personal identifying information (name, address, shipping address, etc) and other subscriber supplied information. The mobile communications device 1A may be a cell phone, and that cell phone can be the voice link and data link for the transaction. This simultaneous or near simultaneous data/voice communication reduces the transaction time, allows for accurate transmission/collection of data, and more secure transmission of data as will be later described.

Figure 7:
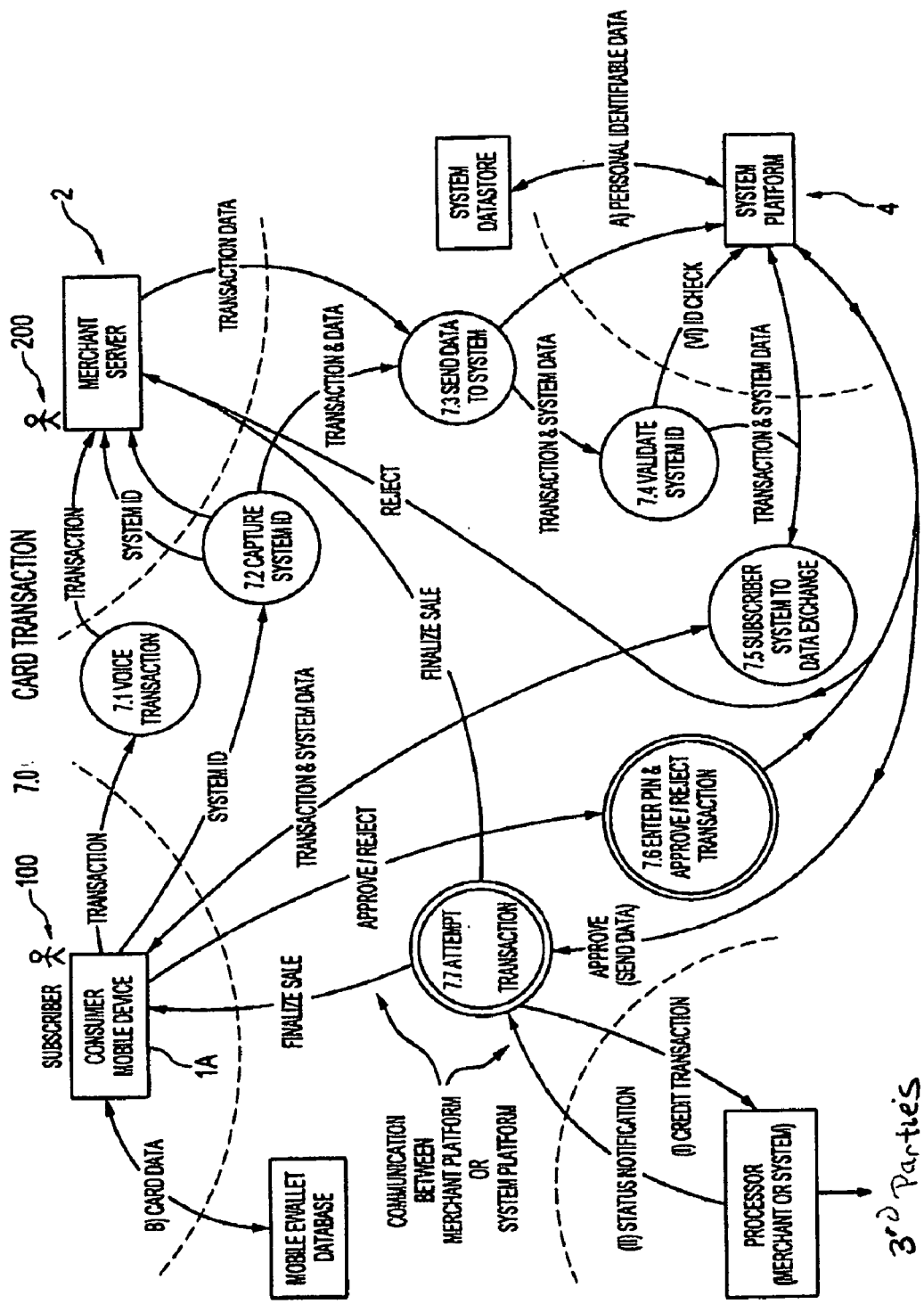
FIG. 7 is a process diagram showing the process of ID identification within a credit card type transaction.

A typical voice transaction proceeds as follows as shown in FIG. 7. The subscriber 100 contacts the merchant representative 100 using a voice link 7.1. A determination is made that the transaction is a System assisted transaction (see 7.2). That knowledge can be verbally communicated between the subscriber 100 and merchant representative 200, or the System platform 4 may identify the caller as a subscriber. Such a determination could be automatically made if the merchant has caller id and the call identifiers are captured (potentially bundled with the merchant identifier) and passed between the merchant platform 2 and the System platform 4. The System platform 4 will check the specific call identifiers against its stored subscriber records to see if the call identifier matches a System subscriber. If a subscriber is identified, that information can be electronically passed to the merchant representative 200 thorough the merchant platform/System platform communications described above, possibly bundled with subscriber personal information data stored on the System platform 4 (if this option is set by the subscriber). Transaction data may be sent from the merchant platform to the System Server 4A either concurrently, or later, providing details of the relevant transaction for use by the System platform or to be provided to a Processor.

Alternatively, if a subscriber is recognized, the System platform can be configured to inform the subscriber mobile device 1A of the initiation of a merchant transaction, and request authorization to communicate personal information data to the merchant platform (to verify ID), and if authorized, transmit data from the storage location (either the mobile database or the System database). Such transmitted personal information can be captured by the merchant's electronic ordering system for population of needed transaction data fields. Such personal information can also be forwarded to a Processor for use in the transaction.

If automatic recognition of subscriber status is not achieved (for instance, the phone number does not identify a subscriber), the merchant representative 200 would verbally determine that the transaction is system assisted, and verbally request the subscriber's System account identifier (hereafter, the "Subscriber ID") and enter that identifier into the merchant electronic ordering system where it will be communicated to the System platform for further processing. The subscriber ID can be the mobile communications device cell number or other number. In any event, the System platform 4 will validate the id and check to see if the subscriber is in good standing prior to allowing further use of the System (see 7.4).

After identification of the transaction as a System assisted transaction, an interchange of data between the subscriber mobile device 1A and merchant platform 2 takes place (through the System platform, see generally 7.3 and 7.5) with data sent from the mobile database or System database under the control of the subscriber. A typical interchange is as follows. The System Server 4A receives the merchant identifier and other vendor supplied information from the merchant platform 2, the transaction details may implicitly or explicitly contain the verification request to verify identity of the subscriber. The System platform 4 identifies the subscriber's "active" or default mobile device from the System database (in the event the subscriber has more than one mobile devices identified as subscriber mobile devices), and notifies that active mobile device 1A of a pending request to verify identity (in a confirmation message) explicitly or implicitly (by verification or acceptance of the particular transaction with the merchant) (generally, 7.5) (using the merchant id or an identifier related to the merchant id). The information from the System Server 4A is displayed on the visual display of the subscriber's mobile device 1A.

After receiving notification on the mobile communications device, the subscriber has the option to indicate confirmation of identity (explicit) or transaction (implicit) and/or release subscriber personal information stored (either on the mobile database (sometimes referred to as an "e-Wallet") or the System database) to the merchant platform 2, or in certain instances on a Processor data base. This is the verification message. The subscriber 100 chooses his response, for instance, to authorize confirmation of identity. Access to the verification message (i.e the ability to send a verification message) can be controlled by secure features located on the mobile device. For instance, authorization (the verification message) may be conditioned upon the user inputting a password, personal identifier number (PIN), biometric data input (such as from a fingerprint reader, speech recognition module, signature reader, feature recognition module, etc) or other security entry, into the mobile device (such as from a fingerprint reader located on the mobile device) (see 7.6). If authorization is granted, identification verification and/or relevant subscriber information can be passed from the storage database (either the System or Mobile database) to the merchant platform 2 through the communications link between the System platform/merchant platform (data stored on the mobile device database would be first passed to the System platform 2 (possibly for decryption) for transmission to the merchant platform 2).

If subscriber data is stored on the mobile communications device database 1A, it is preferred that the data be stored encrypted. Decryption may be accomplished at the System platform 4 with a decryption algorithm or key stored on System platform. Thus, subscriber PI information pertinent to the particular transaction (e.g. name, home address, shipping address, relevant shopping preferences, voter identifier) stored on the mobile database can be passed over the mobile data channels in a secure and protected fashion. The communication channels between the merchant platform 2 and System platform 4 can also be secure, such as using a dedicated communications channel or by employing Secure Socket Layer (SSL) technology or other security technology measures.

The personal information (PI) data or ID authorization can be passed to the merchant's electronic transaction system from the storage site to populate data entries for the particular transaction. While PI information can be passed by voice communication to the merchant representative, use of stored PI data can speed the accuracy and reduce transaction time. Alternatively, the Subscriber PI information (or a subset), if stored on the System databases or Processor databases, can be transmitted upon receiving release authorization from the subscriber (such authorization can be pre-granted as a subscriber option set during subscriber account configuration). If the information is stored on a Processor database, upon receipt of subscriber authorization, the System server would communicate with the Processor server to release the selected information, either to the System server, or the merchant server.

The subscriber 100 verbally indicates to the merchant representative 200 the desired transaction (e.g. vote, enter building, reserve hotel room, purchase shares of xyz stock, etc.) and may verbally provide PI data if such is not automatically provided by the System platform database (or certain needed PI data is not stored in the mobile device memory or System platform database). Details of the transaction are passed between the merchant platform and the System platform (see 7.3) for transmission to the mobile communications device 1A (see 7.5). The pertinent transaction details are displayed on the mobile communications device visual display (such as transaction (.e.g. request for ID verification form Registrar of Voters; request for ID verification from ABC building access) and the system application software resident on the mobile device will request the subscriber to authorize identification request and/or transmit person identification information.

If the Subscriber desires to verify identity or transmit PI, the subscriber indicates acceptance through the mobile device and the resident mobile application program will display available PI information available to send (or alternatively, the system could display the PI information being requested by the merchant system and request authorization to send the requested PI information). The PI information displayed on the mobile communications can be stored on the mobile database or be transmitted from the System platform in response to subscriber's input authorizing transmission.

Before sending a identify verification message (or PI data), the system (either the resident mobile application or the System server) can be configured to request user verification, such as with a PIN number, password, spoken password, biometric data, such as facial feature match input through a mobile phone camera, etc. (the verification can be requested prior to display of available PI information) (see generally 7.6). If user identity is properly verified, a verification of identity and/or PI information is transmitted through the mobile device 1A to the System platform 4 for further processing (verification message). Additionally, the System platform can be configured to verify subscriber identity for multiple subscribers using a single cell phone (for instance, two spouses sharing the same phone, each would have a separate pin number allowing release of relevant PI information).

If the PI information is stored on the mobile database, the selected user identifier is linked to the encrypted PI information (e.g. social security number, hospital identifier, other personal identifiers) stored in the mobile database, and the encrypted PI information will be sent from the mobile database to the System platform. If the PI information is stored on the System database, the selected user identifier (or a value associated therewith) is transmitted to the System platform 4 and will be linked or identified with the actual PI information by the System platform 4 for further processing.

The PI information can be encrypted on the mobile device in a variety of fashions, such as by transmitting partial PI information (encrypted or not encrypted) to the System Platform 4, with the System Platform 4 supplying the missing account information from the System database, (either with number overlap to allow for proper re-assembly or with an assembly value or other indicator to allow for proper assembly of the mobile database portion with the System database portion). Other encryption schemes can be used, such as by having the data encrypted with a decryption key stored on the System platform, etc.

Once the PI information is received or identified by the System Platform 4, such can be sent in response to the request from the Merchant platform or the intermediary Processor, if present.

If the PI information is forwarded to the merchant platform 2, the merchant electronic transaction system 210 may bundle the PI information with transaction information and send such to an intermediary Processor (such as the Voter of Registrations, now seeking for authorization to allow the identified person to vote).

As described, it is preferred that the actual PI information be stored encrypted if stored on the mobile device 1A. If decryption is to be done at the System platform 4, the decrypted information will be forwarded by the System platform 4 to the appropriate entity (generally, the Processor or merchant platform). In other embodiments, the PI information can be encrypted by the associated intermediary Processor as later described, in which case, the account information will have to be forwarded by the System platform 4 encrypted.

Upon return of the identification verification status (e.g. "id confirmed" or "id not confirmed") from the system mobile, it is preferred that all platforms be informed of the verification status. Hence, the platform receiving the verification status can forward such to the remaining platforms. For instance, if the System platform 4 receives the ID verification (such as through the System Processor 2200), such should be forwarded to the merchant platform 2 for processing, or for transmission to an intermediary Processor.

As an example, consider a physician requesting health insurance information and coverage from a subscriber. The patient is identified as a System subscriber, and the physician server requests health insurance and/or coverage information from the System Server, along with transaction details (procedure for which coverage is sought) (this may be separate requests, with basic health insurance information provided first, and a request for coverage of a particular procedure provided later after physician diagnosis). The System Server notifies the subscriber of the request through the mobile communications device, and waits for the subscriber's response provided through the subscriber's mobile device—e.g. authorization to release records, provide health insurance info, or other requested information. Details of the PI request can be displayed on the mobile communications device and the user may chose to provide some or all of the requested PI information. The PI information may be stored on the mobile device, System databases, or even on a Processor's database (for instance, detailed coverage issues would have to be resolved on the health insurance carrier's server). If the subscriber authorizes release of PI data (which functions as an inherent verification of ID) the data is transmitted (either from the mobile, the System data bases, or a request is sent to the relevant Processor to release information, with the Processor releasing the requested data either to the System platform for re-transmission to the physician server (preferred), or the Processor server providing the requested data directly to the physician server.

Generally, the System platform 4 will log appropriate details of the transaction for future reference (such as needed for later System management reports, merchant reports, and subscriber reports to confirm that ID was confirmed (e.g., to tract a party as requesting to vote, authorize release of records, etc) and billing purposes. A particular transaction can normally be identified by a combination of data, such as date, subscriber account, merchant id, and transaction type. If additional identifiers are needed, the System platform can generate a unique ID per transaction (e.g. include a time stamp or generate a separate transaction number). Indeed, in transactions where the merchant is not provided with the PI information, a transaction number (either System platform generated or issuing bank generated) may be needed by the merchant to track the transaction for future references.

B. Data Initiated Transaction

In a data initiated transaction shown in FIG. 2, the transaction is initiated electronically without a voice component, such as through a laptop, desktop, wireless enabled PDA, smart car, magnetically encoded ID card, etc. In a data initiated transaction, the transaction proceeds much like the voice initiated transaction but all information is supplied electronically. Here, the subscriber will have to indicate that the ID verification is to be System assisted, and provide the merchant's electronic transaction system 210 (e.g. web based ordering system) with the System subscriber identifier in order for the System platform 4 to contact the subscriber's mobile communication device 1A. The ID card or smart card or other means electronic communication means could have a code to indicate verification is System assisted.

As described above, information is passed in a series of events between the System platform 4 and merchant platform 2 prior to the verification request. Alternatively, the merchant can receive all information from the subscriber (PI information, subscriber ID, etc) and send a single request for ID verification to the System platform 4. Many existing electronic transaction systems have means of populating data fields for "return" customers, and in such an environment, the merchant may determine to contact the System platform 4 only for ID verification.

C. Other Types of Electronic Transactions: Point of Contact Transaction.

Presently credit, debit cards, health cards and other types of PI cards are constructed from plastic or PVC (polyvinyl chloride) and contain a magnetic stripe on the back of the card. In general, the cardholder's name is embossed on the front of the card along with the card's expiration date and the actual card account number. The back of the card contains the magnetic stripe encoded with pertinent information along with a three or four digit card verification number. New generation device "cards" include smart cards or RF enabled cards, each having a computer chip with information stored and readable from the chip. For other types of cards, information can be stored electronically on the card. Stored information includes the account number, the cardholder's name and additional information such as the authorization process required and discretionary data that is proprietary to the card issuer.

The System can include a "credit card" type ID card device that has encoded on the card a subscriber account number and routing information to the System Server or System platform. In this embodiment, at the point of sale, the System "credit card" can be presented to the merchant (or the card number verbally given to the merchant) (say at an ATM or a building access card reader) and scanned at the POS. The scanned information is forwarded to the System platform through the routing information contained on the System card, or may be routed to the System by the pertinent Merchant Processor, or if present, by the merchant electronic transaction system, if present.

The System platform 4 can then operate in the same modes as specified above for a data transaction in conjunction with a System "credit card"—request ID verification and/or PI information through the subscriber mobile device 1A as described above. In this instance, however, there may be no sophisticated merchant platform present (for instance, in a voting district or small physician's office, "merchant platform" may only be card swipe technology). In this event, communications with the System may be through the Merchant Processor 2100 or directly between the System platform 4 and the low technology merchant platform 2 if the existing merchant technology can be configured to communicate directly with the System platform 4 instead of the Merchant Processor 2100.

The advantage of the System ID card at a POS is that the merchant has no opportunity to capture the actual PI information. Further, if the card is lost or stolen, magnetically swiped or electronically read (in the case of a smart card) the information is still useless, as upon use of the card, the subscriber's mobile device is contacted for ID verification, thereby notifying the subscriber of a third party trying to use his card.

3. Acquiring a System Account and Storing Data on the Mobile Device.

A. Subscriber Account

Figure 8:
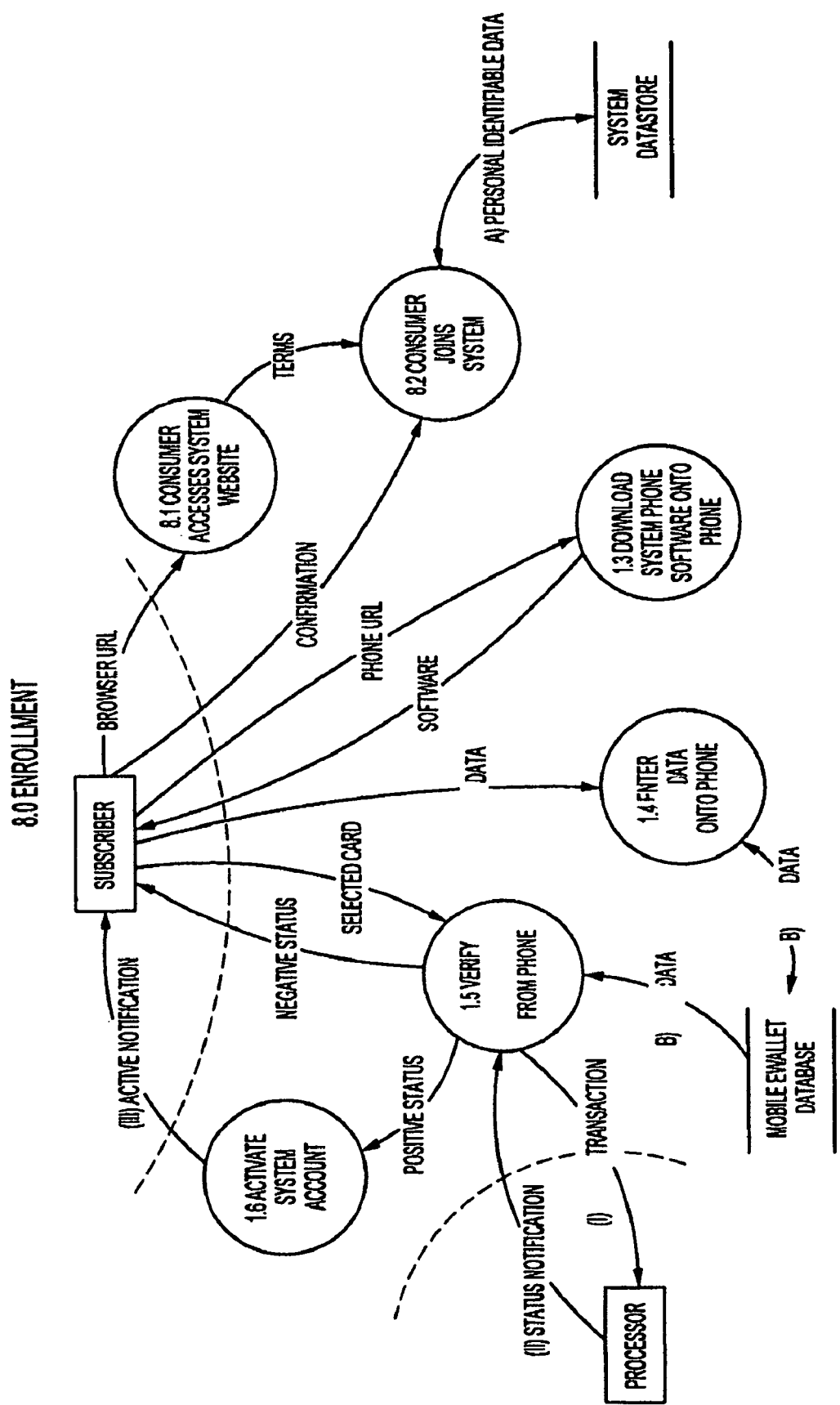
FIG. 8 is a process diagram showing the process of customer subscriber enrolment in the System.

To use the System, a user must become a subscriber by establishing a System account and have at least one or more mobile internet enabled communication devices. FIG. 8 generally shows the enrollment process. To establish an account, the user will access the System platform 4 from the System web based portal. Generally, access is via desktop or laptop, not the mobile device due to the amount of information to be exchanged. In the future, with HTTP enabled mobile devices, direct access by the mobile device may become feasible.

A new user will access the Web portal and request a new account. Through an interchange with the user, certain information needed to establish an account is initially exchanged, for instance: subscriber name, subscriber's system "name" and password, shipping address, billing address, mobile device identification (e.g. phone numbers or static IP addresses), and assignment of the active (or default) mobile device in the event the user desires to register more than one mobile devices, and other pertinent information. The System platform software may use other resources to verify the user supplied information, and after verification, establishes an account for the new Subscriber and will assign a System identifier to the newly established subscriber. If the subscriber's PI information is to be stored on the System database, the subscriber will enter the PI information, establish an account identifier (the alias, if desired, the viewable PI description displayed on the mobile device visual screen), and enter other relevant information for storage on the System. For instance, if subscriber PI is stored on an intermediary Processor database, the user must input sufficient information to allow the System to determine the stored location of the information. As an example, it the subscriber has Blue Cross of Texas coverage and a policy number, this information is probably sufficient for the System platform to contact the Blue Cross of Texas server (assuming Blue Cross of Texas has signed up as a merchant within the System). The System platform may also build a configuration file with the Subscriber's preferences, configurations and other options to be downloaded later to the subscriber's mobile device 1A.

For information be stored on the mobile device 1A, a means must be undertaken to transfer data to the mobile database. One method is to build the mobile database or configuration file on the System, and download the files from the System platform 4 to the mobile device 1A. File transfer protocol (FTP) could be utilized to download both the mobile system application program and the System platform constructed database/configuration files. Alternatively, the Subscriber can download a desktop/laptop application software package through the System portal for building and populating a database that will be later installed on the subscriber's mobile device 1A and/or for possible uploading and storage on the System databases. The laptop/desktop software can be shipped to the user if desired.

When building the database on the subscriber's desktop or laptop, the Subscriber runs the downloaded software on the desktop/laptop to construct the mobile database or configuration files. The downloaded may include a partially filled database structure with information stored on the System database provided by the Subscriber during enrollment, such as subscriber name, address, System supplied subscriber account number, and other information. Additionally, the desktop/laptop software is designed to encrypt designated data entered (when final data is stored on the mobile database) so that the designated data is only stored in encrypted form and can only be decrypted by the System platform.

In either event, (System platform or desktop/laptop built database) the subscriber will enter (or for an established subscriber, modify) user PI information and alias (e.g. how the PI information will be referenced or named on the mobile device, if it is not desired to have PI information displayed on the mobile device (i.e. to protect ID information in the event the device is lost or stolen), access rules (such as PIN assignment, or biometric information needed to access PI or verify ID (e.g. voice sample, or other biometric measure used as a security feature)); personal preference or personal account information (for instance, health identifier, voter registration numbers, selective service number, student ID, etc).

Once the database is built and configurations established, they are saved on the laptop/desktop or System platform. The saved database (or a portion of it) and mobile application software must be transferred to the mobile communications device(s). Several alternatives can be used to transfer data and vary depending on where the data is initially located. First, the mobile system application program must be installed on the mobile device. This can be accomplished by interfacing the mobile device with the desktop, or to the System platform and downloading directly to the mobile's Internet features. Alternatively, the mobile could be interfaced with a storage device (such as a USB flash memory) having the software stored thereon transferred and installed on the mobile device. One embodiment can allow transfer (possibly including the mobile system application program) from the desktop/laptop to the mobile device, through an interface program designed to communicate with the mobile AMS, using a mobile docking station or USB interface (if the mobile device is so equipped). For instance, some mobile communications devices, such as the Blackberries, already have software for syncing data files though a USB connection.

Another option is to download to the mobile device through the System Server through an established system mobile application program. For instance, to update an existing mobile database, the System mobile application is already installed. It is also possible to input information into the mobile device directly through preloaded software, but this is not preferred due to limitations on mobile device keyboards and processing limitations.

Figure 9:
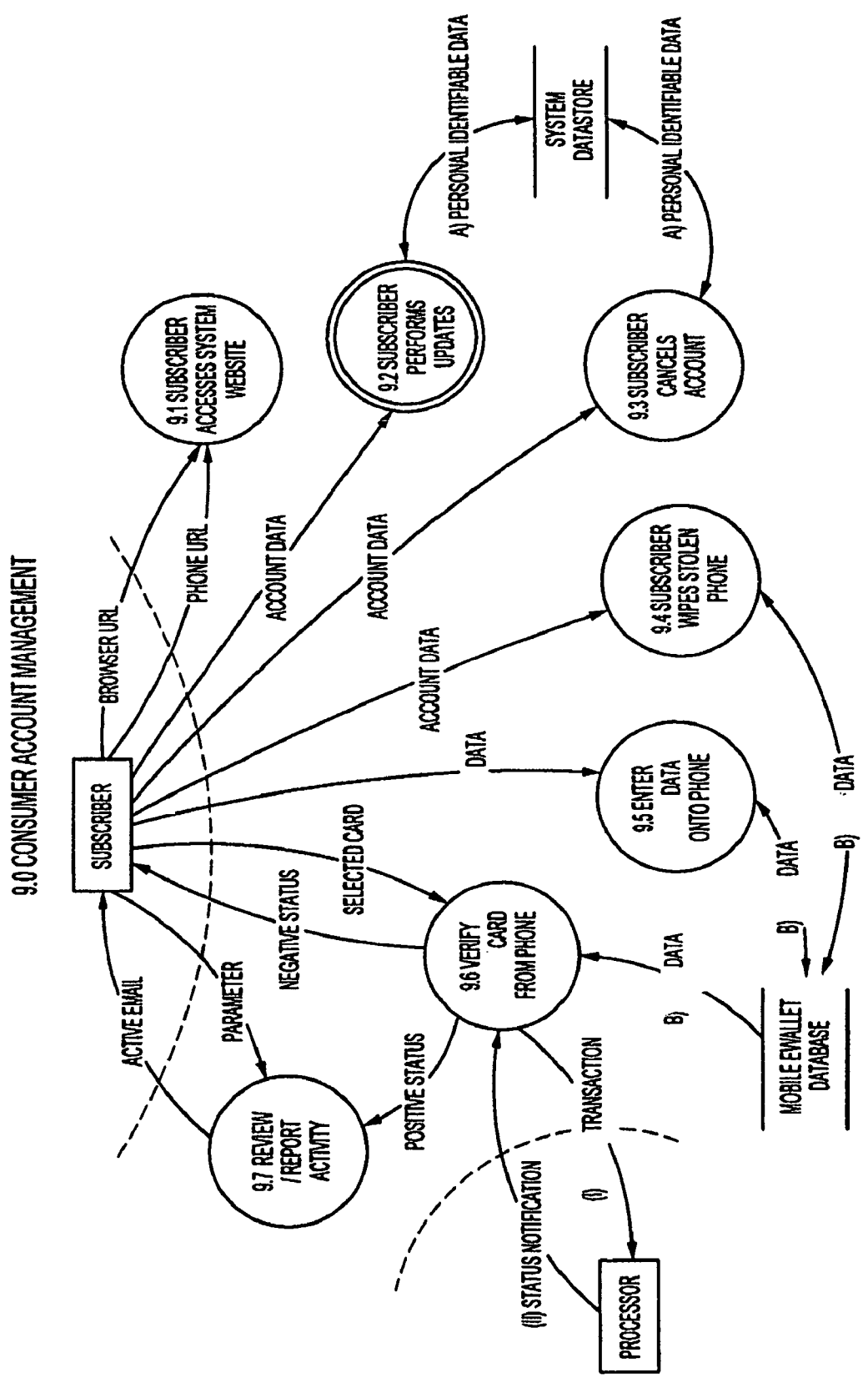
FIG. 9 is a process diagram showing the process of subscriber management of its subscriber account.

An active account can be reconfigured, edited or modified using similar procedures, such as displayed in FIG. 9. As shown in FIG. 9 (see 9.4) the System can provide an option to "wipe" or erase the stored mobile databases. This feature is activated by the Subscriber through the Server web based portal and can be used to erase data on the mobile device in the event the device is lost or stolen. The subscriber will log into the subscriber's account and request the data wipe.

As described, the Subscriber's sensitive identification information can be stored in the System or the mobile device databases (and possibly, a backup desktop database). Further, it is preferred that the certain sensitive data stored in the mobile database (if any) be stored encrypted. Even if the mobile device is stolen or the desktop hacked, the account information remains secure unless the encryption scheme can be broken.

In the current embodiment, the System platform 4 has the ability to decrypt the information stored on the mobile device, as the System platform 4 provides the encryption scheme. In future embodiments, the ability of the System platform 4 to decrypt account information can be eliminated by having the intermediary Processor 3 (e.g. issuing account holder, the Registrar of Voters, the hospital holding the records,) load account information on the System platform database, mobile device database or desktop built database, thereby providing subscriber access to pertinent subscriber records. For instance, the Subscriber could access a hospital through a web portal and request transfer of records to a physician, using the system to verify ID. Alternatively, if the records are stored on a database under user control (System or mobile device) the Subscriber has direct control over his PI information, and can be released by the subscriber after ID verification. Such information can be stored encrypted.

B. Merchant Account

Figure 4:
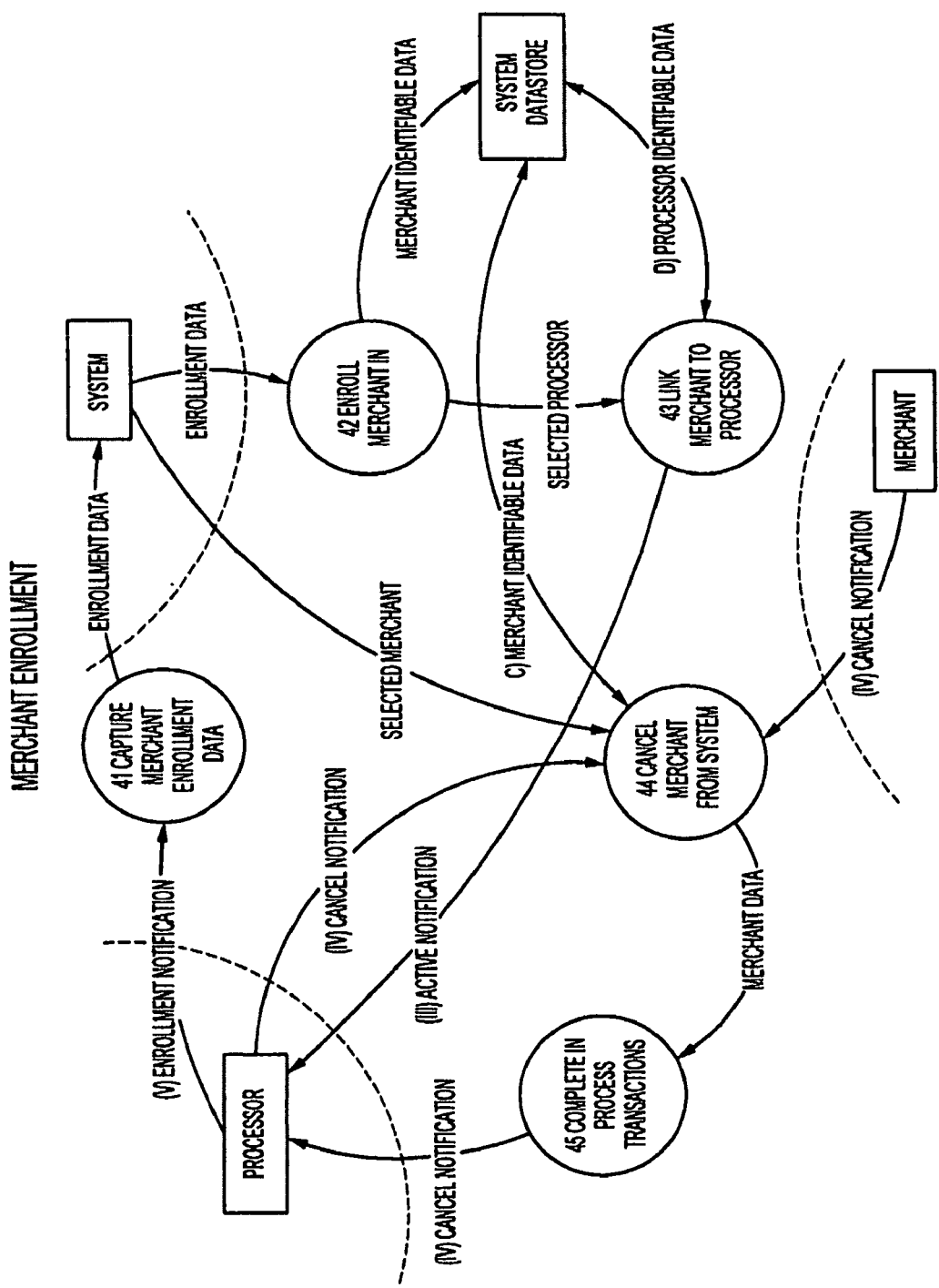
FIG. 4 is a process diagram showing the process of merchant enrollment.
Figure 4A:
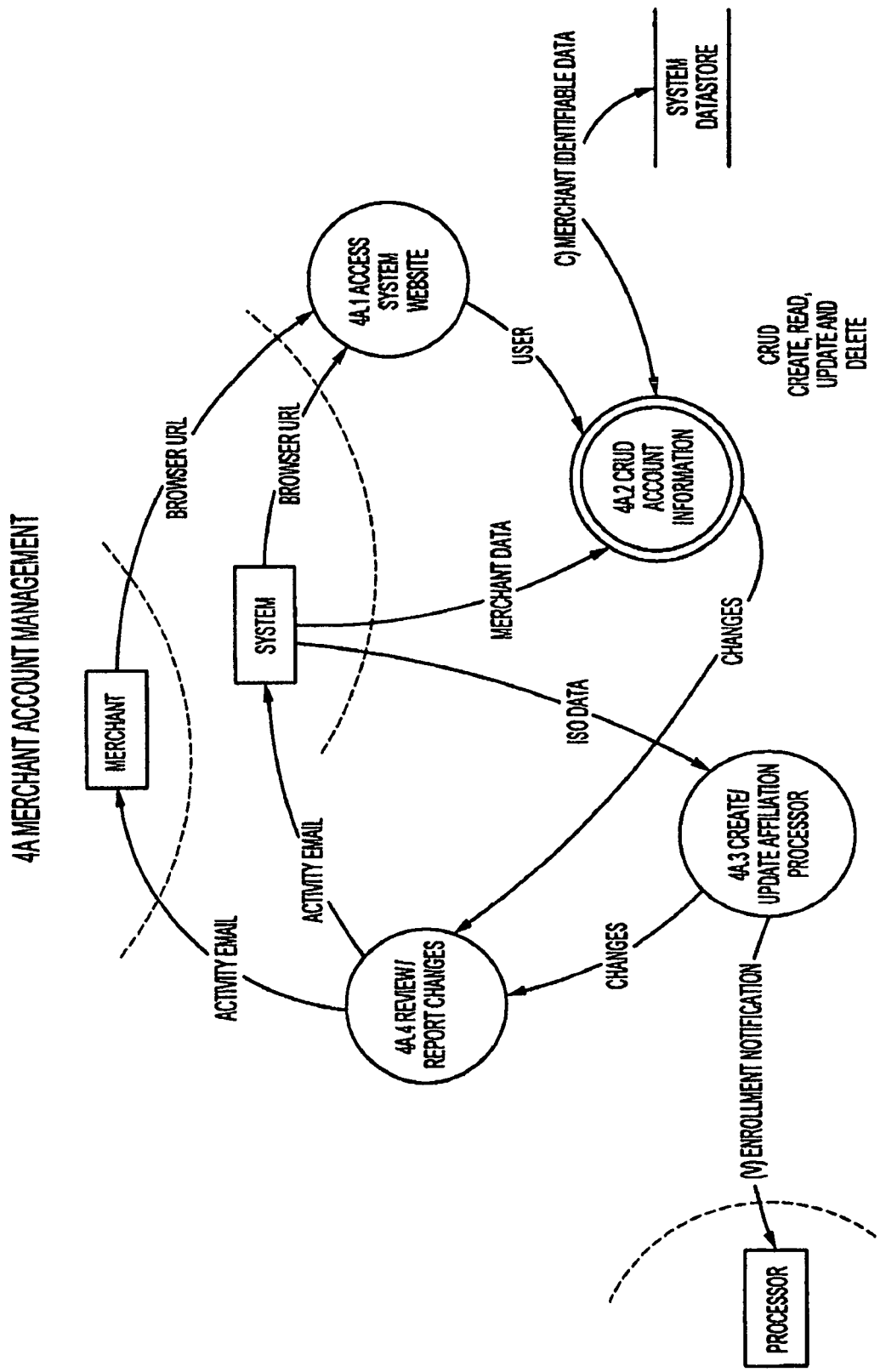
FIG. 4A is a process diagram showing the process of merchant management of its merchant subscriber account.

Finally, for each merchant or vendor using the system (including Processors), the merchant will enroll as a merchant subscriber with the System, and have data associated with the merchant (merchant data). See generally FIG. 4. The merchant platform will be configured to interface the System (such as receive the merchant software module designed or be informed of transfer request formats for web services). The enrolled Merchant will be given a merchant subscriber ID and associated with the System Processor if the System will process the request for PI information (see generally 4.3) for this merchant or the merchant subscriber account data will indicate that a Processor will be the processing party. Details of the Merchant Processor may be included in the System database, if needed. The merchant will configure the merchant's system data, particularly, merchant data that interfaces with subscriber's PI or preference data. For example, the merchant may be a travel agent and recognize American Airlines miles discounts, Hilton bonus points or other third party vendor programs. If the particular subscriber's preferences indicate such an account, this information can be used to help assist the transaction after confirmation of identity. By allowing the merchant data space to interface with the subscriber personal information space, details of a particular transaction can be established quickly and efficiently. Obviously, the merchant will have the ability to manage, edit or modify the merchant's account data, such as shown in FIG. 4A. The merchant has the capability to access the system (possibly for a fee) and receive reports, billing information, statistical analysis, etc.

C. Processor Accounts

Figure 5:
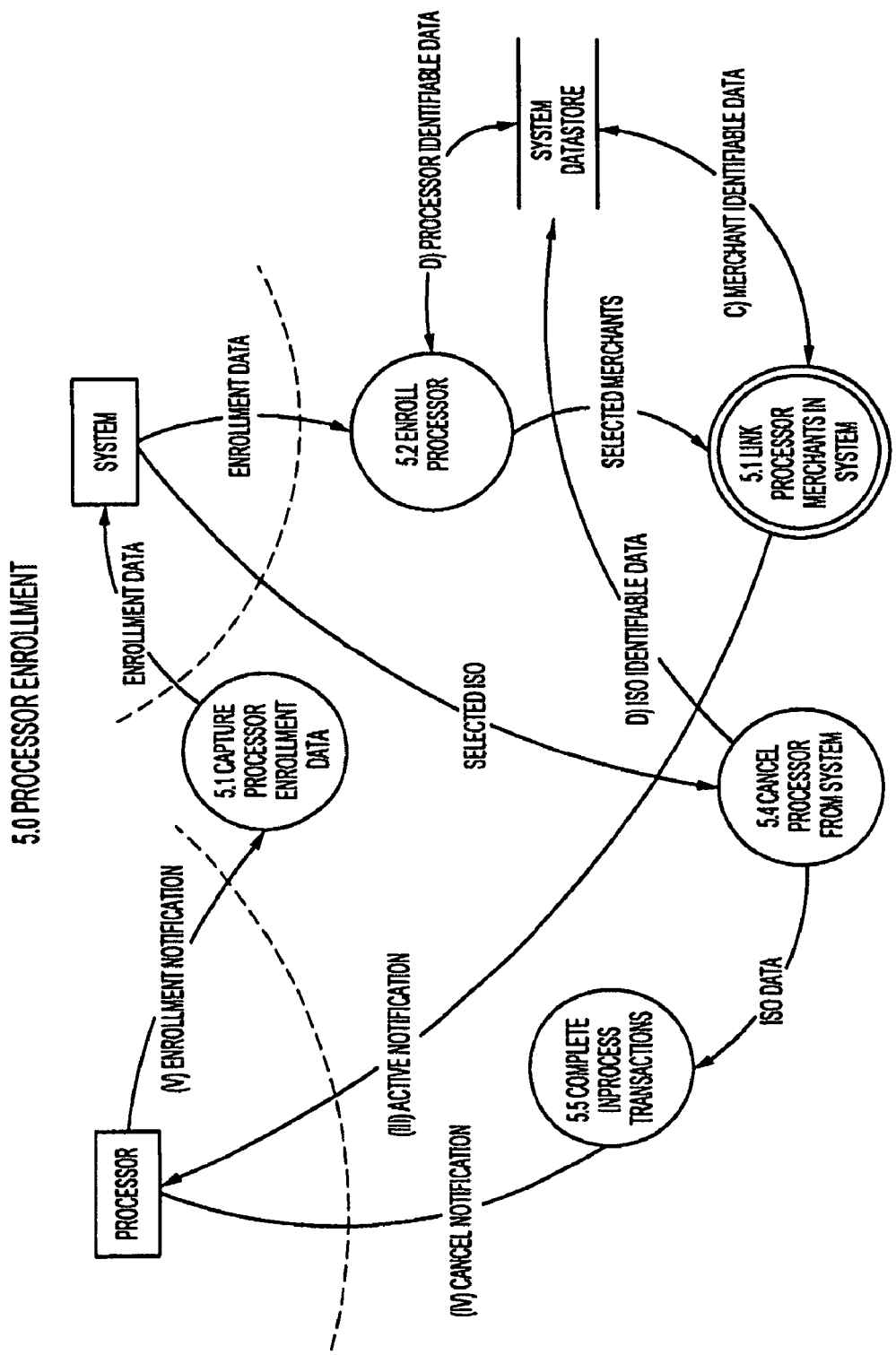
FIG. 5 is a process diagram showing the process of Processor enrollment.
Figure 6:
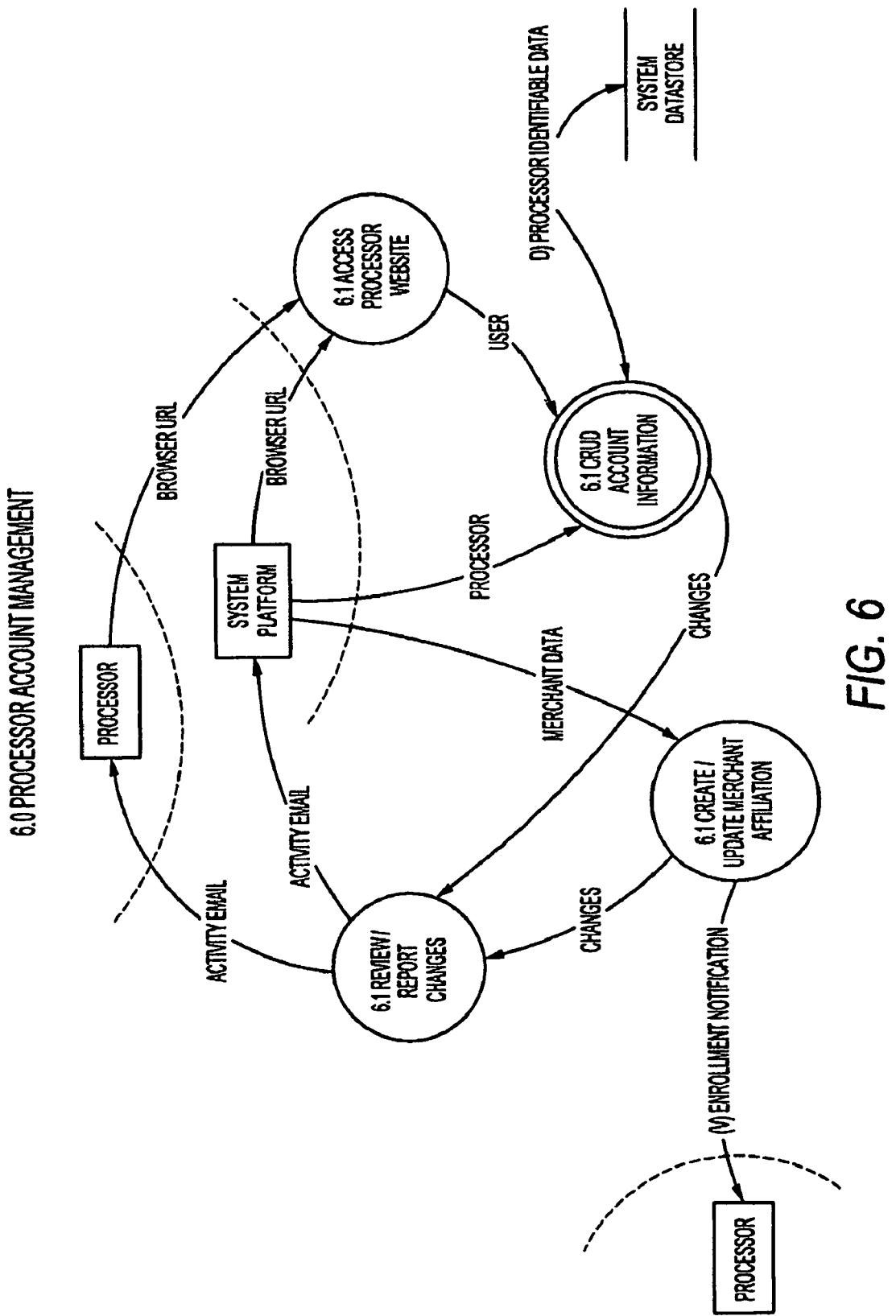
FIG. 6 is a process diagram showing the process of merchant management of its merchant subscriber account.

For System Processors, the System includes the software to enroll Processors as a System Processors or Processor subscriber and to manage the Processor's system data account such as shown in FIGS. 5 and 6 (manage Processor account). System Processors must be enrolled as Processor subscribers and linked to those merchants for whom the Processor will act as an intermediary transaction member.

I claim:

1. A method comprising:

receiving by a computing device an electronic request from a remote location to verify an identity of a party, the computing device containing information regarding a plurality of parties and mobile devices associated with the parties, the electronic request identifying the remote location and the identity to be verified;

transmitting by the computing device a confirmation message to the mobile device associated with the party, the confirmation message identifying the remote location and the identity to be verified;

receiving by the computing device a verification message from the mobile device in response to the confirmation message, the verification message facilitating verification or denial of identification, and, in response to verification, the verification message authorizing release of personal identification information of the identified party.

2. The method of claim 1, wherein the personal identification information is located on the mobile device associated with the party.

3. The method of claim 1, wherein the personal identification information is located on the computing device.

4. The method of claim 1, further comprising transmitting by the computing device the personal identification information of the identified party to the remote location.

5. The method of claim 1, wherein the remote location comprises a party to a transaction.

6. An apparatus comprising:
- means for receiving an electronic request from a remote location to verify an identity of a subscriber, the means containing information regarding a plurality of subscribers and mobile devices associated with the subscribers, the electronic request identifying the remote location and the identity to be verified;
- means for transmitting a confirmation message to the mobile device associated with the subscriber, the confirmation message identifying the remote location and the identity to be verified;
- means for receiving a verification message from the mobile device in response to the confirmation message, the verification message facilitating verification or denial of identification, and, in response to verification, the verification message authorizing release of personal identification information of the identified subscriber.

7. The apparatus of claim 6, wherein the means for receiving an electronic request, the means for transmitting a confirmation message, and the means for receiving a verification message comprise one or more computing devices.

8. The apparatus of claim 7, wherein at least one of the one or more computing devices comprises a server.

9. An article of manufacture including a computer-readable medium having instructions stored thereon that, in response to execution by a computing device, cause the computing device to perform a method comprising:
- receiving by the computing device an electronic request from a remote location to verify an identity of a subscriber, the computing device containing information regarding a plurality of subscribers and mobile devices associated with the subscribers, the electronic request identifying the remote location and the identity to be verified;
- transmitting by the computing device a confirmation message to the mobile device associated with the subscriber, the confirmation message identifying the remote location and the identity to be verified;
- receiving by the computing device a verification message from the mobile device in response to the confirmation message, the verification message facilitating verification or denial of identification, and, in response to verification, the verification message authorizing release of personal identification information of the identified subscriber.

10. The article of manufacture of claim 9, further comprising instructions that, in response to execution by the computing device, cause the computing device to transmit the personal identification information of the identified subscriber to the remote location.

11. The method of claim 9, wherein the remote location comprises a party to a transaction.

12. A method comprising:
- sending by a first computing device an electronic request to a second computing device to verify an identity of a party, the second computing device containing information regarding a plurality of parties and mobile devices associated with the parties, the electronic request identifying the identity to be verified and being routed to the mobile device of the party;
- receiving by the first computing device a message from the second computing device, the message including personal identification information of the identified party, the release of which was authorized in a verification message sent by the mobile device of the party.

13. The method of claim 12, wherein the request further identifies a transaction to be effected by the party.

14. A method comprising:
- receiving by a mobile device a confirmation message from a computing device, the confirmation message identifying a transaction and an identity of a party to be verified;
- transmitting by the mobile device a verification message to the computing device in response to the confirmation message, the verification message facilitating verification or denial of identification of the identity, and, in response to verification, the verification message authorizing release of personal identification information of the identified party to effect the identified transaction.

15. The method of claim 14, wherein the computing device is communicatively coupled to another computing device associated with the transaction, wherein the another computing device originated a request to verify the identity of the party.

* * * * *